United States Patent [19]

Nguyen

[11] Patent Number: 5,402,055
[45] Date of Patent: Mar. 28, 1995

[54] AC ADAPTER INCLUDING DIFFERENTIAL COMPARATOR FOR TRACKING BATTERY VOLTAGE DURING TRICKLE CHARGE

[75] Inventor: Hai N. Nguyen, Spring, Tex.

[73] Assignee: Compaq Computer Corporation, Houston, Tex.

[21] Appl. No.: 954,334

[22] Filed: Sep. 30, 1992

[51] Int. Cl.[6] .............................................. H02J 7/04
[52] U.S. Cl. ......................................... 320/23; 320/32
[58] Field of Search ....................... 320/22, 23, 24, 31, 320/32, 39, 40

[56] References Cited

U.S. PATENT DOCUMENTS

| | | | |
|---|---|---|---|
| 3,652,915 | 3/1972 | Eberts | 320/31 |
| 3,659,181 | 4/1972 | Bembenek | 320/22 |
| 3,854,082 | 12/1974 | Nasby et al. | 320/22 |
| 4,006,397 | 2/1977 | Catotti et al. | 320/31 |
| 4,061,956 | 12/1977 | Brown et al. | 320/22 |
| 4,086,525 | 4/1978 | Ibsen et al. | 320/33 |
| 4,118,661 | 10/1978 | Siekierski et al. | 320/40 |
| 4,209,736 | 6/1980 | Reidenbach | 320/22 |
| 4,220,905 | 9/1980 | Quarton | 320/39 |
| 4,225,815 | 9/1980 | Lind et al. | 320/39 |
| 4,371,826 | 2/1983 | Shelly | 320/21 |
| 4,392,101 | 7/1983 | Saar et al. | 320/20 |
| 4,418,310 | 11/1983 | Bollinger | 320/39 |
| 4,433,277 | 2/1984 | Carollo et al. | 320/24 |
| 4,455,523 | 6/1984 | Koenck | 320/43 |
| 4,553,081 | 11/1985 | Koenck | 320/43 |
| 4,609,860 | 9/1986 | Fasen | 320/14 |
| 4,629,965 | 12/1986 | Fallon et al. | 320/39 |
| 4,670,703 | 6/1987 | Williams | 320/22 |
| 4,677,363 | 6/1987 | Kopmann | 320/44 |
| 4,709,202 | 11/1987 | Koenck et al. | 320/43 |
| 4,746,854 | 5/1988 | Baker et al. | 320/40 |
| 4,767,977 | 8/1988 | Fasen et al. | 320/23 X |
| 4,820,965 | 4/1989 | Siemer | 320/31 |
| 4,843,299 | 6/1989 | Hutchings | 320/31 |
| 4,918,368 | 4/1990 | Baker et al. | 320/40 |
| 4,947,123 | 8/1990 | Minezawa | 324/427 |
| 4,961,043 | 10/1990 | Koenck | 320/21 |
| 5,049,804 | 9/1991 | Hutchings | 320/23 X |
| 5,136,231 | 8/1992 | Faulk | 320/31 |
| 5,192,905 | 3/1993 | Karlin et al. | 320/23 |
| 5,254,932 | 10/1993 | Bittar et al. | 320/23 |
| 5,256,957 | 10/1993 | Wiesspeiner | 320/32 X |

FOREIGN PATENT DOCUMENTS

| | | |
|---|---|---|
| 3901096 | 8/1989 | Germany. |
| 63-316643 | 12/1988 | Japan. |
| 0616688 | 6/1978 | U.S.S.R. . |
| 1190429 | 11/1985 | U.S.S.R. . |

Primary Examiner—Kristine L. Peckman
Attorney, Agent, or Firm—Pravel, Hewitt, Kimball & Krieger

[57] ABSTRACT

A differential input comparator for controlling the output voltage of an AC adapter to track the voltage of a rechargeable battery during trickle charge. An output voltage sensing circuit typically used to regulate the AC adapter output voltage at a maximum level is modified to regulate the output voltage at a minimum DC voltage approximately equivalent to a fully discharged battery plus a nominal voltage level. The differential input comparator is coupled to a current limiter coupled in the charge path of the battery and to the sense signal to provide a separate current path used to modify the voltage level of the sense signal. The differential input comparator regulates the voltage across the current limiter to the nominal voltage level by controlling the AC adapter output voltage through the sense signal during trickle charge of the battery.

10 Claims, 3 Drawing Sheets

AC ADAPTER INCLUDING DIFFERENTIAL COMPARATOR FOR TRACKING BATTERY VOLTAGE DURING TRICKLE CHARGE

BACKGROUND OF THE INVENTION

1. Field the Invention

The present invention relates to a differential input comparator to control the output voltage of an AC adapter during trickle charge to reduce the voltage across a current limiter by tracking the voltage of a rechargeable battery coupled to the AC adapter.

2. Description of the Related Art

Many electronic devices such as portable computers are powered either through an AC line or a rechargeable battery. In such devices, an AC adapter is typically provided to convert the AC line voltage to a DC voltage to provide power to the device and to charge the battery. Since the voltage of the battery varies depending upon its charge, it is convenient that the DC voltage provided by the AC adapter be allowed to vary within a certain predetermined range roughly based on the voltage range of the battery. Generally, the maximum level of the DC voltage provided by the AC adapter is larger then the maximum battery voltage to assure that the AC adapter can fully charge the battery. In such devices, a DC-DC converter might be included to convert the DC voltage from the AC adapter and the battery to whatever specific voltage levels the electronic device requires.

Typically, AC adapters charge the battery at several rates, including a fast charge to fully charge the battery in a relatively short amount of time and a trickle charge to maintain the full charge on the battery. The charge current through the battery during fast charge is typically monitored and regulated by providing a sense signal to a feedback loop which is used to control the output voltage of the AC adapter. Once full charge is achieved, trickle charging is initiated using circuitry which may be implemented in one of several ways as described below.

One of the simplest methods of trickle charging the battery is to use a current limiter such as a resistor located in the charge path of the battery which roughly limits the charging current to a desirable predetermined trickle charge level. A typical desirable trickle charge level is 20 mA. The output voltage of the AC adapter is typically regulated at a predetermined maximum level, so that during trickle charge the voltage differential between the fully charged battery and the maximum AC adapter output voltage appears across the current limiter. If a resistor is used as the current limiter, its value is selected based on this voltage differential and the desired trickle current. For example, if the maximum output voltage level of the AC adapter is 18 volts, the battery is 16 volts when fully charged and a trickle charge of 20 mA is desired, a 100 ohm resistor should suffice. The power loss through the 100 ohm resistor is 40 milliwatts (mW) during normal trickle charge.

However, several factors may lead to premature termination of fast charging resulting in a low battery voltage during trickle charge, which further causes a large voltage drop across the current limiter. This results in significant power loss. For example, AC adapters typically monitor battery temperature and terminate fast charging if a maximum temperature level is reached, very likely causing premature termination of the fast charge cycle. In the above example, if the battery only charges to 14 volts due to excessive temperature, and the current limiter is a resistor having a resistance of 100 ohms, a trickle current of 40 mA flows through the trickle charge resistor at a power loss of approximately 160 mW in the trickle charge resistor alone which is four times the power level the trickle resistor normally consumes. Most of this power loss is converted to heat. Thus, the AC adapter designed using the above method is very inefficient during trickle charge when a significant voltage drop develops across the trickle charge resistor during trickle charge.

Furthermore, a large voltage drop across the resistor occurs causing excessive power loss if the battery is deeply discharged having a very low voltage. For example, if the voltage of the battery is 8 volts when coupled to the AC adapter, its voltage is too low for fast charging, so that it will be trickle charged until it reaches a predetermined minimum voltage level, such as 10 volts. The output voltage level of the AC adapter is 18 volts, causing a 10 volt drop across the current limit resistor which results in a power loss of 1 watt.

An alternative design for trickle charging is to use a current or voltage regulator rather than a resistor in the charge path of the battery to limit the charge current to a specific value. The normal power loss during trickle charge would be 40 mW. Again, however, a significant voltage differential may develop across the regulator during trickle charge, resulting in power loss and undesirable heat generation. For example, if the voltage drop is 4 volts across the current limiter and the current is limited to 20 mA, the power loss is approximately 80 milliwatts, which is twice the normal power consumption expected according to the above example. Furthermore, if the battery voltage is 8 volts when coupled to the AC adapter, a power loss of 200 mW of power occurs.

Every increase in power loss and heat production is undesirable in modern portable computers, where every component must be optimized. It is therefore desirable to reduce the production of unwanted heat and to increase the efficiency of an AC adapter during trickle charge without significantly increasing its costs.

SUMMARY OF THE PRESENT INVENTION

An AC adapter including a battery voltage tracking apparatus according to the present invention is relatively simple and inexpensive, and regulates the output voltage of an AC adapter to a desirable nominal voltage level above the battery voltage to increase efficiency by limiting power loss due to heat during trickle charge to an acceptable level. A voltage divider used to provide a sense signal to a feedback circuit which regulates the AC adapter output voltage is first modified to regulate the output voltage approximately at a minimum desired DC voltage level rather than at a maximum level. The minimum DC level is approximately the voltage level of a fully discharged battery plus a predetermined nominal voltage level. This modification is relatively insignificant since it generally involves changing the values of resistors in the resistive divider network, and possibly adding a third resistor if not already present.

A differential input comparator is coupled between a current limiter and the voltage divider and operates to modify the voltage of the sense signal to regulate the voltage across the current limiter to the predetermined nominal voltage level. If a resistor is used as the current limiter, its value may need to be changed to provide the proper trickle charge current given the predetermined nominal voltage level. The differential input comparator provides a separate current path from the voltage divider which draws current to modify the sense signal, which causes a corresponding change in the output voltage of the AC adapter. In this manner, the voltage across the current limiter in the charge path of the battery is limited to a nominal level, and the power consumption is likewise limited to an acceptable level. The differential input comparator turns off if the battery voltage falls significantly below the minimum level of the output voltage, and turns fully on if the battery rises to the maximum level of the AC adapter output.

BRIEF DESCRIPTION OF THE DRAWINGS

A better understanding of the present invention can be obtained with the following detailed description of the preferred embodiment is considered in conjunction with the following drawings, in which.

DETAILED DESCRIPTION OF THE PREFERRED EMBODIMENT

Figure 1:
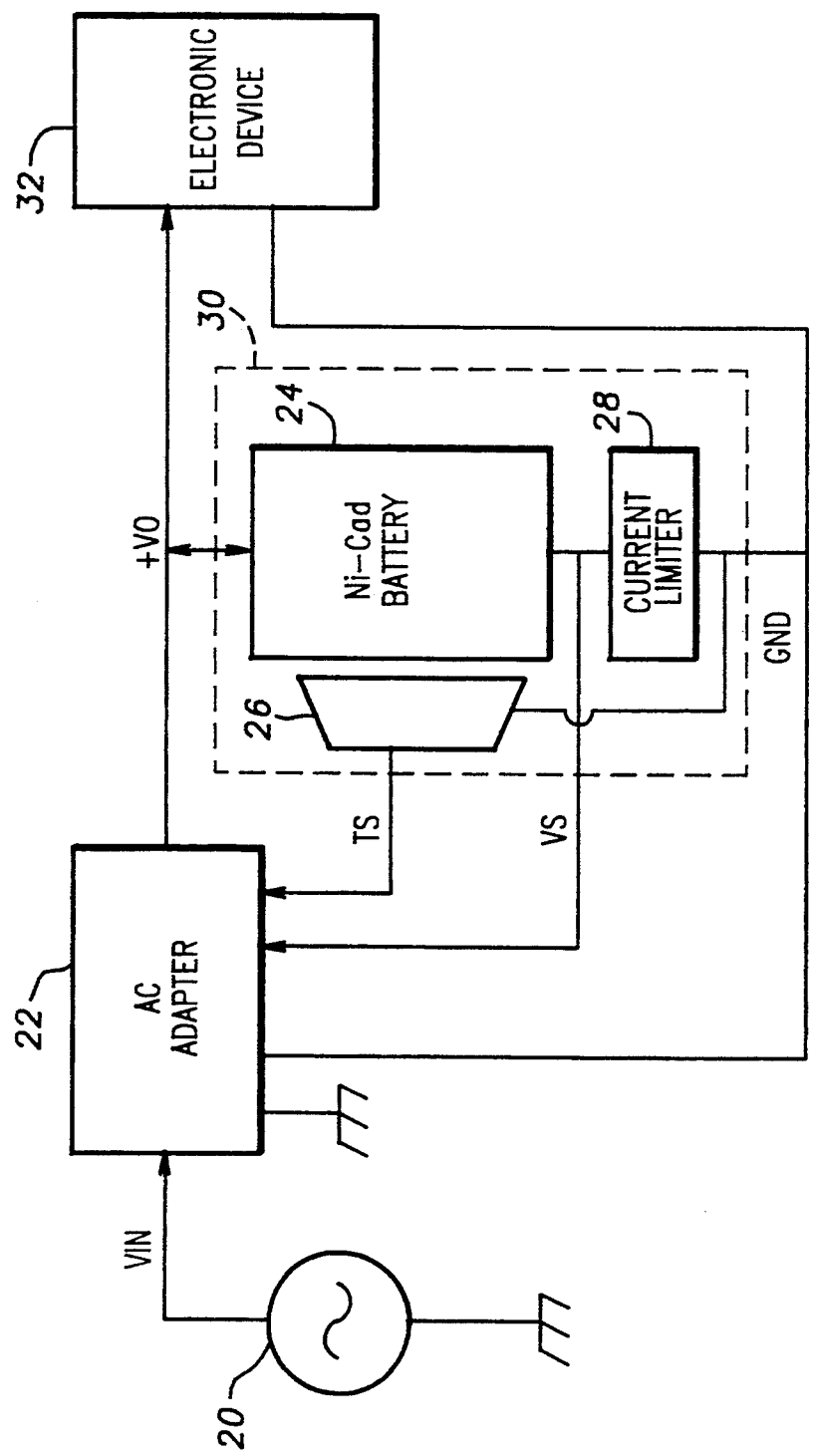
FIG. 1 is a simplified block diagram of an AC adapter coupled to an electronic device and a rechargeable battery.

Referring now to FIG. 1, an AC source 20 provides an AC signal referred to as VIN which is connected to the input of an AC adapter 22. The AC adapter 22 converts the VIN signal to a regulated DC voltage signal referred to as VO, which is used to provide power to an electronic device 32 and to charge a battery 24. The battery 24 is preferably a nickel-cadmium or nickel-metal hydride type rechargeable battery, although other types of rechargeable batteries are contemplated. The positive terminal of the battery 24 is preferably connected to the VO signal and its negative terminal is connected to one side of a current limiter 28. The other side of the current limiter 28 is connected to GND, otherwise referred to as ground, and the connection between the battery 24 and the current limiter 28 provides a voltage sense signal referred to as VS, which is provided to the AC adapter 22. A temperature sensor 26 is preferably in good thermal contact with the battery 24 and provides a signal TS to the AC adapter 22. The temperature sensor is preferably connected to ground and the TS signal has a voltage level indicative of the temperature of the battery 24.

The battery 24, the temperature sensor 26 and the current limiter 28 are preferably provided in a removable battery pack 30, having appropriate connection terminals for the VO, TS and VS signals and ground. The AC adapter 22 is typically removable so that a charged battery 24 provides power to the electronic device 32 by discharging through the VO signal when the AC adapter 22 is not present. When the AC adapter 22 is connected to the electronic device 32 and to a discharged battery 24, the AC adapter 22 typically enters fast charge to charge the battery 24 in a preferably short amount of time, and the VO signal is pulled down to the approximate voltage of the battery 24. In the preferred embodiment, the AC adapter 22 includes a fast charge switch 40 (FIG. 2) coupled between the VS signal and ground which provides a separate fast charge current path to bypass the current limiter 28 during fast charge. As the battery voltage rises during fast charge, the VO signal rises correspondingly. Once fast charge is completed, the AC adapter 22 turns off the fast charge switch 40 to trickle charge the battery 24 to maintain its charge.

The current limiter 28 may be implemented in one of several different ways depending upon the AC adapter 22 and the requirements of the electronic device 32. For example, the current limiter 28 could comprise a resistor 60 (FIG. 2) coupled between the negative terminal of the battery 24 and ground having an appropriate resistance to limit the charge current through the battery 24 to a desirable level. The current limiter 28 could alternatively comprise a current or voltage regulator 61 as know to those skilled in the art and as shown in FIG. 3. It is also contemplated that the current limiter 28 be located between the VO signal and the positive terminal of the battery 24, where an alternative voltage sense signal VS' (not shown) would be provided by the junction between the current limiter 28 and the battery 24. In this case, the voltage across the current limiter 28 is the difference between the VO and the VS' signals. In either case, the VS or VS' signal has a voltage level indicative of the voltage across the current limiter 28.

The AC adapter 22 is preferably designed to provide a constant amount of power between the VO signal and ground to charge the battery 24 and to provide power to the electronic device 32. The constant power level is preferably approximately 30 watts, which is greater than the maximum power requirements of the electronic device 32. Most of the remaining power not used by the electronic device 32 is provided to charge the battery 24. Briefly, the AC adapter 22 preferably operates with a maximum power regulated characteristic comprising a constant switching frequency flyback DC-DC converter with a discontinuous inductor current through the primary inductance of a power transformer so that the peak inductor current is limited to a maximum value. If the constant frequency is f, the inductance of the primary inductance is L and the peak current through the primary inductance is i, then the energy stored, and thus transferred to the output of the AC adapter 22, is $\frac{1}{2} Li^2$ and the power level at the output is $\frac{1}{2}Li^2f$. The values of f, i and L are chosen to provide the desirable power level. For more details on the constant power technique, please see copending application Ser. No. 701,657, entitled "Maximum Power Regulated Battery Charger" to Kris P. Dehnel, filed May 16, 1991, which is hereby incorporated by reference.

If the battery 24 and the electronic device 32 are unable to absorb all the power from the AC adapter 22 using the constant power technique, the voltage of the VO signal rises. The AC adapter 22 also preferably limits the maximum voltage level of the VO signal. This maximum voltage level is referred to as $VO_{MAX}$, which is larger then the maximum voltage of the battery 24. For example, after fast charge is completed, the battery 24 is unable to absorb the remaining power in the constant power embodiment causing the VO signal to rise. Thus, the VO signal is typically regulated at $VO_{MAX}$ during trickle charge so that the positive terminal of the battery 24 rises to the $VO_{MAX}$ level. To achieve the reduction in power, the peak current through the primary inductance is reduced below the peak level i to regulate the VO signal to $VO_{MAX}$. The voltage differential between the fully charged battery 24 and the VO signal is placed across the current limiter 28 and is consumed as heat.

Preferably, the battery 24 charges to approximately 16 volts so that only about 2 volts develop across the current limiter 28. If the current limiter 28 is a resistor, its resistance is chosen based on this expected voltage level and the desired trickle current level. Thus, if 2 volts is expected across the current limit resistor and a trickle charge of 20 mA is desired, a 100 ohm resistor would be used. A power loss of 40 milliwatts (mW) is thus expected during normal trickle charge. Other factors, such as excessive battery temperature, may lead to premature termination or fast charge so that voltage of the battery 24 is less than its maximum value. For example, if $VO_{MAX}$ is 18 volts and the voltage of the battery 24 is 14 volts when fast charge is terminated, then 4 volts is placed across the current limiter 28. If the current limiter 28 comprises a 100 ohm resistor, then approximately 160 milliwatts of power is consumed by the current limit resistor during trickle charge which is four times the normal expected level. The added power loss causes inefficiency of the AC adapter 22 and a significant build-up of heat. Further, the trickle charge current is larger than desirable.

The AC adapter 22 is preferably designed to monitor the voltage of the battery 24 and may allow fast charge only when the voltage of the battery 24 is above a predetermined minimum level, which is preferably 10 volts. If a deeply discharged battery 24 is coupled to the AC adapter 22 so that its voltage is only 8 volts, a voltage of 10 volts develops across the current limiter 28. If the current limiter 28 comprises a 100 ohm resistor, an excessive trickle current of 100 mA occurs and an excessive power loss of 1 watt is consumed by the current limiter 28.

If the current limiter 28 comprises a current regulator to limit the current through the battery 24 to a desirable trickle current, such as 20 mA, the voltage differential between the fully charged battery 24 and the VO signal is still developed across the current limiter 28, also resulting in a significant power loss. Again, if the maximum voltage of the battery 24 is 14 volts after fast charge and $V_{MAX}$ is 18 volts and the trickle charge rate is 20 mA, the current limiter 28 consumes approximately 80 milliwatts of power, converting most of this power loss to heat. Further, if the voltage of the battery 24 is 8 volts causing trickle charge due to low voltage, a power loss of 200 mW results.

Figure 2:
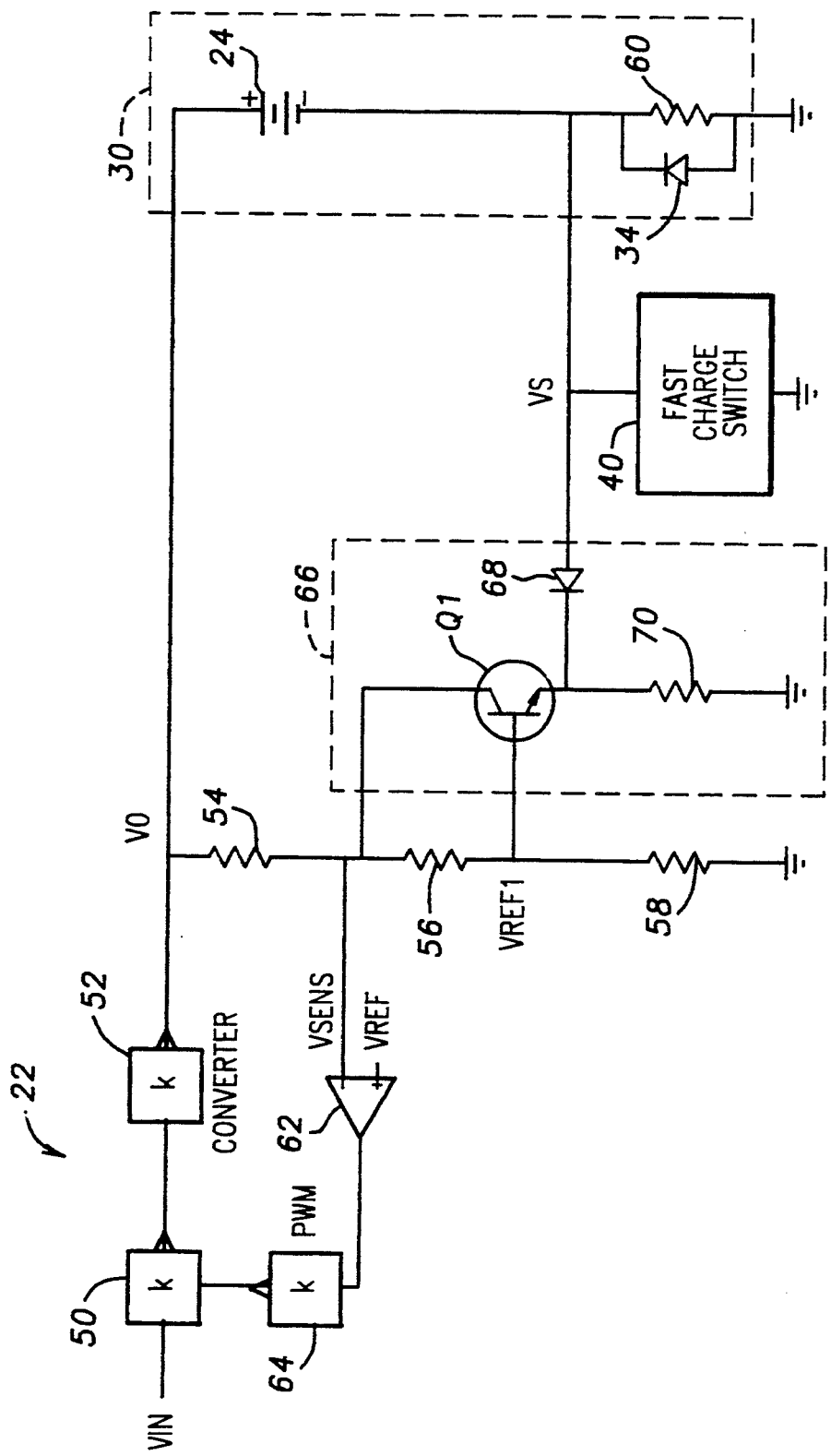
FIG. 2 is a simplified schematic diagram of a typical control loop of the AC adapter of FIG. 1 including a differential input comparator according to the present invention.
Figure 3:
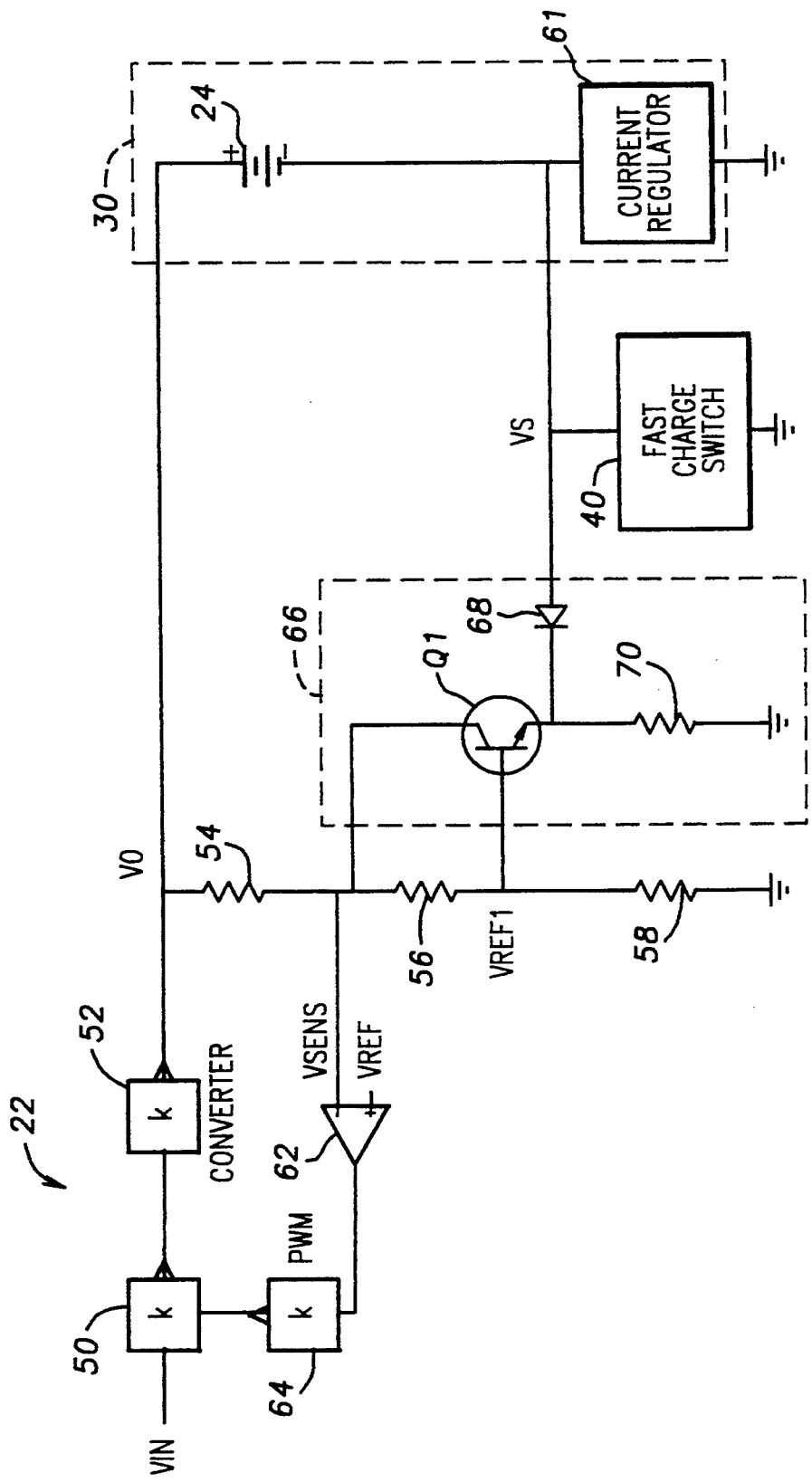
FIG. 3 is a simplified schematic diagram of an alternative embodiment of the control loop of the AC adapter of FIG. 1 using a current regulator.

Referring now to FIG. 2, a schematic diagram of a portion of the AC adapter 22 coupled to the battery 24 and to a differential input comparator 66 according to the present invention is shown. Similar components assume like reference designators. For purposes of simplicity, significant portions of the AC adapter are shown as gain blocks since it is understood that many different implementations of the AC adapter 22 could be used in conjunction with the present invention. Although the constant power technique is preferred, the AC adapter 22 could also be implemented as a maximum voltage, maximum current regulated converter where the VO signal is typically regulated at a maximum voltage level or at a maximum current level if the voltage is pulled below the maximum level.

The VIN signal is applied to a first gain block 50, which may comprise an input filter and bridge rectifier, to convert the VIN signal to an unregulated DC voltage. The gain block 50 may also comprise the primary side of a power transformer used to transfer energy from the unregulated DC source to the VO signal. The gain block 50 provides an output which is coupled to a second gain block 52, which may comprise the secondary of the transformer as well as output filters. The gain block 52 provides the VO signal which is connected to the positive terminal of the battery 24, and the negative side of the battery 24 is connected to one side of the trickle resistor 60. The other side of the resistor 60 is connected to ground. A diode 34 has its cathode connected to ground and its anode connected to the VS signal. The diode 34 provides a discharge current path to bypass the resistor 60 when the battery 24 is providing power to the electronic device 32. The temperature sensor 26 and the remaining portions of the fast charge circuitry are not included for purposes of clarity.

In the preferred embodiment, the current limiter 28 comprises the resistor 60 which has a resistance of 50 ohms, and the VS signal is provided by the junction between the negative terminal of the battery 24 and the resistor 60, although it is understood that the current limiter 28 could comprise other circuit devices such as a current regulator. The fast charge switch 40 is coupled between the VS signal and ground and is preferably located within the AC adapter 22. The fast charge switch 40 preferably comprises an enhancement metal-oxide-semiconductor field effect transistor (MOSFET) having its drain and source terminals coupled between the VS signal and ground across the resistor 60 to provide a separate charge path to bypass the resistor 60 during fast charge. Thus, when the fast charge switch 40 is turned on by the AC adapter 22, the battery 24 is fast charged through the fast charge switch 40 which has a significantly lower resistance than the resistor 60 preferably by a factor greater than 10. When the fast charge switch 40 is turned off, it provides a high resistance path between the VS signal and ground. The high resistance path through the fast charge switch 40 preferably has an effective resistance which is greater than 100 times the resistance of the resistor 60, so that most of the charge current through the battery 24 passes through the resistor 60. Details of the preferred fast charge switch 40 are provided in U.S. application Ser. No. 596,223, entitled "Ni-Cad Battery Charge Rate Controller" to Richard A. Faulk, filed Oct. 12, 1990 and allowed on Jan. 23, 1992, which application is hereby incorporated by reference.

The VO signal is sensed through a voltage divider comprising resistors 54, 56 and 58 coupled in series between the VO signal and ground. One side of the resistor 54 is coupled to the VO signal, and the other side of the resistor 54 is coupled to a signal referred to as VSENS, which is used to sense the voltage level of the VO signal. One side of the resistor 56 is coupled to the VSENS signal and its other side is coupled to one side of the resistor 58. The other side of the resistor 58 is coupled to ground. The feedback circuit of the AC adapter 22 comprises a differential comparator 62 having an inverted input connected to the VSENS signal and a non-inverting terminal connected to a signal referred to as VREF. The VREF signal has a known convenient voltage level, which is preferably 2.5 volts.

The output of the differential amplifier 62 is connected to the input of a pulse width modulation (PWM) circuit 64 which has an output connected to the gain block 50. Normally, the values of the resistors 54, 56 and 58 were chosen so that the VSENS signal was equal to the VREF signal when the VO signal was at $VO_{MAX}$.

In this manner, the VO signal was limited to $VO_{MAX}$ during trickle charge which resulted in a significant voltage level of the VS signal across the resistor 60. The resistance values of the resistors 54, 56 and 58 are instead chosen for purposes of the present invention to initially regulate the voltage level of the VO signal at a minimum voltage level, which is referred to as $VO_{MIN}$, ignoring the effects of the differential input comparator 66 and the battery 24. $VO_{MIN}$ is preferably approximately 11 volts representing the voltage level of a fully discharged battery 24 plus a relatively small nominal voltage.

A differential comparator 66 according to the present invention is shown connected between the VS and VSENS signals. The comparator 66 preferably includes a bipolar transistor Q1 having its collector terminal connected to the VSENS signal and its base terminal connected to a signal VREF1, which is the junction between the resistors 56 and 58. The relative resistance values of the resistors 56 and 58 are chosen to properly bias the transistor Q1 according to the functions described more fully below. A diode 68 has its anode connected to the VS signal and its cathode connected to the emitter terminal of the transistor Q1 and also connected to one side of a resistor 70. The other side of the resistor 70 is connected to ground. It is appreciated that the differential comparator 66 preferably comprises simple and common electrical components which are inexpensive and easy to implement.

The operation of the differential input comparator 66 will now be described in relation to the AC adapter 22 and the battery 24. If the voltage of the battery 24 is below a certain minimum voltage level which is preferably approximately 10 volts, the fast charge switch 40 is turned off so that the VREF1 signal has a low voltage and the VS signal has a relatively high voltage level. This biases the diode 68 on, which further biases the transistor Q1 off. On average, the current through the diode 68 is below 10 mA so that the voltage across the diode 68 is approximately 0.5 volts. In this manner, the VO signal is regulated at $VO_{MIN}$ as determined by the resistors 54, 56 and 58. As the voltage of the battery 24 rises due to trickle charging, the VS signal begins to decrease until eventually the voltage of the battery 24 rises to 10 volts and the VS signal begins to go below one volt. The diode 68 is then momentarily switched off, biasing the transistor Q1 on, so that the transistor Q1 begins to draw current through its collector terminal from the VSENS signal, thereby effectively lowering the voltage level of the VSENS signal. The AC adapter 22 responds through its feedback loop by increasing the VO signal to keep it at a nominal voltage level above the voltage of the battery 24. This nominal voltage level is preferably approximately one volt.

It is noted that since the nominal voltage level is one volt in the preferred embodiment, the resistor 60 is 50 ohms to achieve the desirable trickle charge of 20 mA. Further, if the voltage of the battery 24 is below 10 volts, the VO signal is regulated at $VO_{MIN}$ rather than $VO_{MAX}$, which is a difference of 7 volts in the preferred embodiment. Thus, if the voltage of the battery 24 is 8 volts, only 3 volts develops across the resistor 60 at a power loss of 180 mW and a trickle current of 60 mA. This is a substantial improvement over the power loss of 1 watt and a trickle current of 100 mA in prior designs using a 100 ohm resistor.

When the voltage of the battery 24 rises above 10 volts, the AC adapter 22 will usually fast charge the battery 24 by activating the fast charge switch 40. When the fast charge switch 40 is activated, the voltage of the VS signal tends to decrease relatively quickly since the effective resistance across the fast charge switch 40 is substantially less than the resistor 60. The diode 68 is momentarily switched off, thereby turning on the transistor Q1 on, thereby drawing more current through its collector terminal. This, in turn, tends to increase the VSENS signal so that the feedback loop of the AC adapter 22 responds by increasing its output voltage and current. The increase in the output current of the AC adapter 22 causes the voltage of the VO and VS signals to rise. Eventually, either the VS signal reaches one volt or the AC adapter 22 reaches its maximum power output if the constant power technique is being used.

In the preferred constant power embodiment, it is preferable that the constant power level regulate the control loop during fast charge rather than the differential input comparator 66. In this manner, the effective resistance of the fast charge switch 40 is chosen at an appropriate level so that the maximum constant power level of the AC adapter 22 is reached before the VS signal reaches one volt. If the constant power level is 30 watts, the VS signal is approximately one volt, a discharged battery 24 is approximately 10 volts and the resistor 60 has a resistance of 50 ohms, the effective resistance of the fast charge switch 40 should be 0.35 ohms or less when it is turned on. Thus, the transistor Q1 is turned fully on and the output of the differential amplifier 62 saturates and does not control the VO signal. Consequently, the battery 24 consumes the full power provided by the AC adapter 22 during fast charge, minus whatever power is being drawn by the electronic device 32.

Alternatively, the AC adapter 22 could be regulated by a maximum voltage, maximum current technique rather than constant power technique as previously described. In this manner, the effective resistance across the fast charge switch 40 is designed to provide a suitable charging current through the battery 24 when the VS signal is approximately equal to one volt. Depending upon the specific implementation of the fast charge circuitry not shown, the differential input comparator 66 could control the output voltage of the AC adapter 22 during fast charge. Therefore, the present invention is not limited to the implementation of the AC adapter 22, allowing design flexibility.

Once the battery 24 is fully charged so that its voltage is preferably between $VO_{MAX}$ and $VO_{MIN}$, the AC adapter 22 switches to trickle charge mode by turning off the fast charge switch 40 and the transistor Q1 operates in the active region. The AC adapter 22 monitors the temperature of the battery 24 using the temperature sensor 26 and terminates fast charge if the temperature of the battery 24 rises to a predetermined maximum level. If this occurs, fast charge may be terminated prematurely so that the voltage of the battery 24 is less than its maximum value. As described previously, this causes excessive trickle charge and increased power loss in the current limiter 28, or the resistor 60.

It was noted that during trickle charge, the battery 24 and the electronic device 32 may be unable to consume the constant power level of the AC adapter 22, so that the feedback loop is controlled by the differential input comparator 66. In this manner, if the voltage of the battery 24 increases, the voltage of the VS signal decreases, thereby momentarily switching off the diode 68, so that the transistor Q1 becomes more active and draws more current through its collector terminal, thereby reducing the voltage of the VSENS signal. The feedback loop of the AC adapter 22 responds by increasing the VO signal high enough to forward bias the diode 68 so that the VO signal stops increasing. On the other hand, if the voltage of the battery 24 decreases, the voltage of the VS signal increases, thereby increasing the voltage at the emitter terminal of the transistor Q1. This causes the transistor Q1 to be less active, thereby drawing less current into its collector terminal, thus increasing the voltage level of the VSENS signal. The AC adapter 22 responds by decreasing the voltage of the VO signal, which lowers voltage of the VS signal enough to bias the transistor Q1 on again, so that the VO signal stops decreasing.

The differential comparator 66, therefore, draws a current through the collector terminal of the transistor Q1 and into the resistor 70 which is proportional to the voltage differential between the VREF1 signal and the VS signal, tending to maintain the VREF1 signal approximately equivalent to the VS signal. In this manner, when the battery 24 is trickle charging, the VS signal is regulated at the nominal voltage level. This nominal voltage is less then the voltage differential between $VO_{MAX}$ and the voltage of the battery 24 when fully charged which reduces the voltage level of the VS signal appearing across the resistor 60. This is especially important if fast charge is terminated prematurely. Therefore, if the voltage of the battery 24 is 14 volts at termination of fast charge, the voltage across the resistor 60 is reduced from 4 volts to 1 volt during trickle charge due to the operation of the differential comparator 66. If the resistance of the resistor 60 is 50 ohms and the differential comparator 66 is used to limit the nominal voltage to one volt, the resistor 60 consumes 20 mW rather than 160 mW of power in previous designs where the resistor 60 was 100 ohms and the differential comparator 66 was not known or used. Recall that the resistance of the resistor 60 is chosen to provide the appropriate trickle charge current. Thus, the present invention provides a more efficient design and reduces power loss due to heat produced by the resistor 60. Further, the trickle current is maintained at the appropriate level after termination of fast charge.

The operation of the circuit in FIG. 2 is very similar if the current limiter 28 is a 20 mA current regulator rather than a resistor, since the VS signal is still maintained at approximately the same nominal voltage level. In that case, the power consumption is reduced from 80 mW to 20 mW if the voltage of the battery 24 is 14 volts when fast charge is terminated. Also, since the VO signal is regulated at $VO_{MIN}$ rather than $VO_{MAX}$ if the voltage of the battery 24 is below 10 volts, the voltage developed across the current limiter 28 is 7 volts less in the preferred embodiment compared to prior designs, resulting in a power savings of 140 mW.

In summary, the output voltage sensing means typically comprising a voltage divider is modified to regulate the output of the AC adapter to a minimum voltage level based on the voltage level of a fully discharged battery 24. A differential input comparator according to the present invention is coupled to the current limiter in the charge path of the battery and the output voltage sensing means to regulate the voltage across the current limiter to a predetermined nominal voltage level during trickle charge. If the current limiter comprises a resistor, its value is modified to maintain the appropriate trickle charge given the desired nominal voltage level.

During fast charge, the differential input comparator 66 is on but does not effect the control loop in a constant power embodiment. Otherwise, if the AC adapter 22 is a maximum output voltage regulation type, the differential input comparator 66 may be used to control the fast charge current through the battery 24. In this manner, the AC adapter output voltage is regulated between a minimum and maximum voltage level at the nominal voltage level above the voltage of the battery 24 when the battery is being trickle charged.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. An AC adapter for charging a battery and for powering an electronic device, the electronic device having a maximum power requirement, the AC adapter comprising:

means having a sense input and an output, said means for providing electrical power up to a predetermined maximum power level and developing a voltage level at said output, wherein said voltage level of said output is regulated by a sense signal provided at said sense input and wherein said predetermined maximum power level exceeds the maximum power requirement of the electronic device;

a battery coupled between said power providing means output and ground;

means coupled to said power providing means for sensing said voltage level of said output and for providing said sense signal at a level so that said power providing means regulates said output at a predetermined minimum voltage level, wherein said predetermined minimum voltage level corresponds to the voltage level of said battery when fully discharged;

a current limiter coupled in a charge path of said battery providing a signal indicative of a voltage developed across said current limiter; and a differential comparator coupled to said power providing means sense input and receiving said signal indicative of a voltage developed across said current limiter for modifying said sense signal to a level so that said power providing means regulates said voltage level of said output at a level to maintain said current limiter signal at a predetermined nominal voltage level.

2. The AC adapter of claim 1, wherein said differential comparator is turned off and does not modify said sense signal if the voltage of said battery is below said predetermined minimum voltage level minus said predetermined nominal voltage level.

3. The AC adapter of claim 1, further comprising:

a fast charge switch coupled in parallel with said current limiter, said fast charge switch having a predetermined low effective resistance when turned on wherein it provides said predetermined low effective resistance in parallel with said current limiter, and said fast charge switch having a predetermined high resistance when turned off wherein it provides said predetermined high resistance in parallel with said current limiter; and wherein said predetermined low effective resistance is chosen so that said power providing means provides said predetermined maximum power level when said fast charge switch is turned on.

4. The AC adapter of claim 1, wherein said predetermined nominal voltage level is approximately one volt.

5. The AC adapter of claim 1, wherein said means for sensing said voltage level of said output comprises three resistors coupled in series between said power providing means output and ground, wherein said sensing means has a junction providing said sense signal.

6. The AC adapter of claim 1, wherein said current limiter comprises a resistor.

7. The AC adapter of claim 1, wherein said current limiter comprises a current regulator.

8. The AC adapter of claim 1, wherein said differential comparator includes a bipolar transistor.

9. The AC adapter of claim 1, wherein said battery is coupled between said power providing means output and said current limiter, wherein said current limiter is coupled between said battery and ground, and wherein said signal indicative of a voltage developed across said current limiter is provided by an electrical junction between said battery and said current limiter.

10. The AC adapter of claim 9, wherein
said sensing means comprises a first resistor coupled between said power providing means output and said sense input and second and third resistors coupled in series between said sense input and ground; and wherein said differential comparator comprises:
a bipolar transistor having its collector terminal coupled to said sense input and its base terminal coupled to a junction between said second and third resistors;

a fourth resistor coupled between the emitter terminal of said transistor and ground; and a diode having its anode coupled to receive said signal indicative of the voltage across said current limiter and its cathode coupled to the emitter terminal of said transistor.

* * * * *